United States Patent [19]
Julie

[11] 3,839,695
[45] Oct. 1, 1974

[54] HIGH VOLTAGE SHIELDED DIVIDER

[75] Inventor: Loebe Julie, New York, N.Y.

[73] Assignee: Julie Research Laboratories, Inc., New York, N.Y.

[22] Filed: Oct. 2, 1972

[21] Appl. No.: 293,923

[52] U.S. Cl................... 338/64, 323/43.5, 338/92
[51] Int. Cl............................................. H01c 1/06
[58] Field of Search .............. 338/64, 73, 118, 92; 174/35 CE; 334/85; 336/84; 323/74, 79, 94 R, 43.5 R; 324/126

[56] References Cited
UNITED STATES PATENTS

| | | | |
|---|---|---|---|
| 3,239,751 | 3/1966 | Sibary | 338/64 X |
| 3,710,252 | 1/1973 | Till | 324/126 |

Primary Examiner—C. L. Albritton
Attorney, Agent, or Firm—Eliot S. Gerber

[57] ABSTRACT

An electrical measuring instrument, which is a high voltage A.C. divider, consists of a series of connected impedance elements. The impedance elements are at least partly enclosed by an exterior stacked co-axial series of concentric conductive shielding rings, which rings are axially elongated and insulated and spaced from each other. In one embodiment at least one electrically conductive axially elongated ring is internal to the other rings and insulated from them.

5 Claims, 4 Drawing Figures

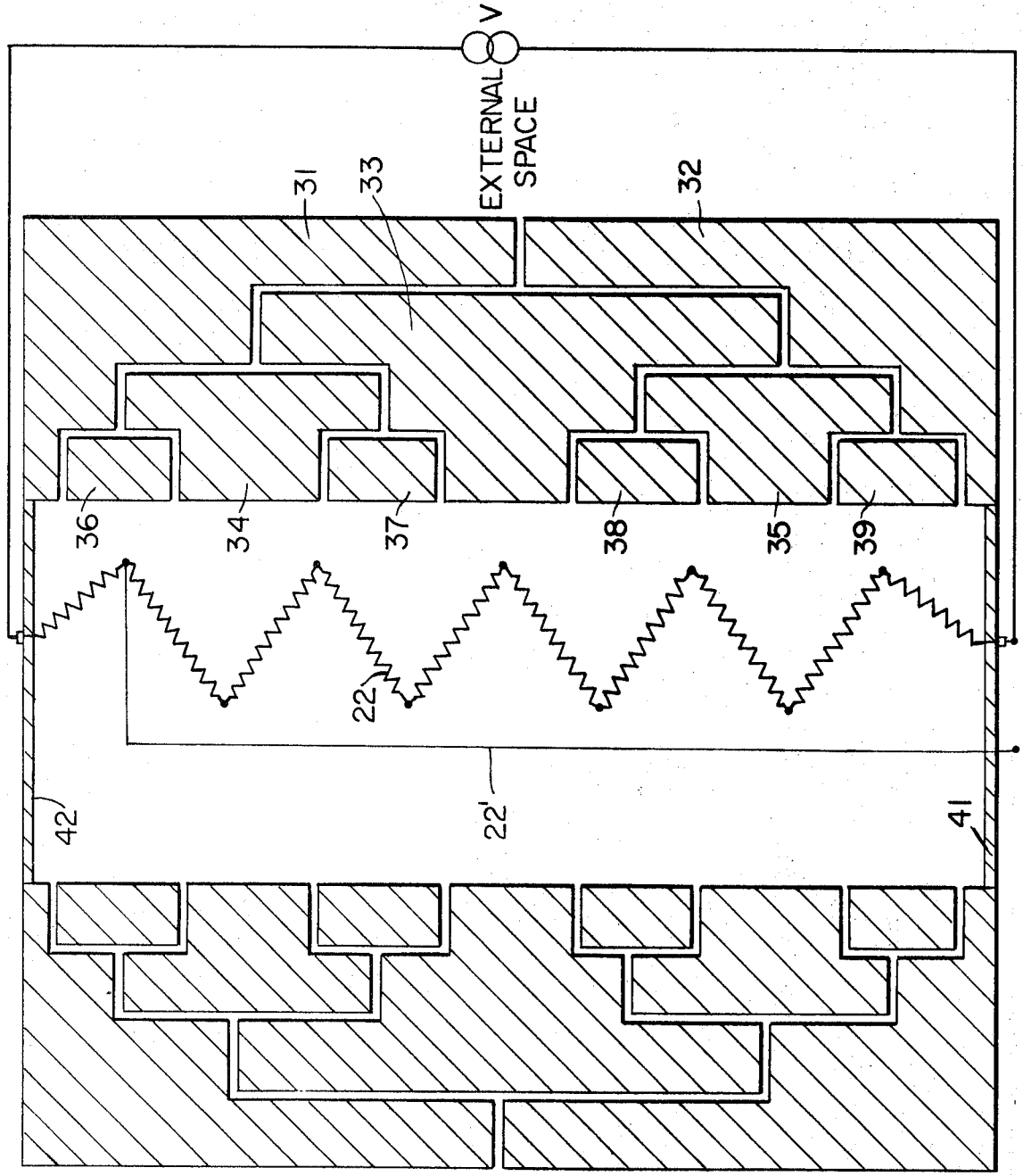

3,839,695

HIGH VOLTAGE SHIELDED DIVIDER

BACKGROUND OF THE INVENTION

The present invention relates to a novel type of potential divider for high voltage alternating current measurement.

An accurate measurement of high voltage is useful in a variety of contexts. For example, in designing a high voltage power line insulator it is useful to know the A.C. flash-over value for a single line insulator or a string of line insulators. As another example, the surge voltage breakdown test of a lightening arrestor depends upon the knowledge of the A.C. voltage. As still another example, the spark-over voltage of a sphere-gap depends upon an accurate measurement of the A.C. voltage. It should be noted particularly in those voltages which are over 100,000 volts that the frequency is not of a high frequency and is generally below 100 Hz.

For the measurement of voltage the primary standard is the voltage of an unsaturated standard cell, the voltage of which is usually 1.0186 volts. This type of standard cell, which is the reference standard for voltage measurements, is maintained at a constant temperature and has a constant voltage. Even in the measurement of higher A.C. voltages, it is necessary to have devices which ultimately refer back to the direct current standard cell. The reference back to the standard cell makes use of a "transfer instrument," which is an instrument designed to read the same voltage on the effective value of alternating voltage as on direct voltage, a suitable transfer instrument being, for example, an electro-dynamic instrument or an electrostatic voltmeter.

The potential divider is generally an impedance with one or more tap points, permitting the measurement of the voltage drop between tap points such that the measurement does not appreciably, or even perceptively, change the current flowing through the divider. The potential divider is connected across the voltage to be measured and the value of the voltage, as measured between the taps, is multiplied by the ratio of the total impedance to the impedance of the tap sections, which provides the value of the voltage across the total impedance.

Generally, high voltage potential dividers use sections of resistance, or resistance shunting capacitors or capacitors. The present invention, relating to the guard shielding of such high voltage dividers, is intended to be applicable to all three of those types, as well as other types of potential dividers using impedance elements.

A typical resistive divider consists of a string of N-resistors each of which has the same value of resistance. The resistors are connected end-to-end in series. It is known to use an outer shield which is electrically conductive and connected to a source of direct current energy which is independent of the A.C. supply voltage being measured. This type of outer shield is intended to minimize current flow from external ionization, migratory dust particles, minor surface discharges, surface leakage across the insulating column supports, and to thereby reduce the effect on the string of resistors of those irregularly varying effects.

In another type of resistor, high voltage divider resistors are uniformly spaced wire-wound resistors and are electrically connected to toroidally shaped corona shields, the shields being connected at the end of each group of resistors. A high breakdown insulation, such as Bakelite or Isolantite, is used to support the resistors and between the corona shields.

The resistive divider has certain drawbacks, such as relatively high consumption of power, residual inductance, and stray capacitance. In order to avoid these drawbacks, it has been suggested that a second resistor be placed in parallel with a first or working resistor. This second resistor is composed of sections each contained within a metal box or shield. However, even this type of divider lacked the accuracy which was desired for various measurements.

SUMMARY OF THE INVENTION

In accordance with the present invention a high voltage A.C. divider consists of a string of resistors or other impedance elements. In one embodiment two outer conductive shield rings are stacked to surround the impedance string and an inner co-axial ring also surrounds part of the string. In another embodiment an inner series of conductive rings are stacked so that they are electrically isolated and lie between the outer shield rings and the impedance string. As used herein the term "ring" includes a toroid solid or hollow structure or extended tubular members and those shield members which are not circular in cross-section, but may have square or odd shapes in cross-section.

It is a feature of the present invention to provide a high voltage shielded divider including a dividing circuit consisting of a connected series of impedance elements, a variable tap means which may be moved relative to the said elements, and two external connection terminals connected to said impedance elements, and an electrical shield at least partially surrounding said impedance elements.

The electrical shield comprises a first conductive ring and a second co-axial conductive ring, means connecting said first and second conductive rings to the high voltage source, and a third conductive ring co-axial with the other rings and positioned between said first and second conductive rings and said impedance elements and insulated from them.

It is a further feature of the present invention that the high voltage sheilded divider further comprises a fourth conductive ring and a fifth conductive ring which are positioned substantially coaxial with the other rings and between the impedance elements and the second ring and insulated from them and not connected to the source of high voltage.

BRIEF DESCRIPTION OF THE DRAWINGS

Other features of the present invention will be apparent from the detailed description provided below, which is the inventor's best mode of practicing the invention, the description being taken in conjunction with the accompanying drawings. In the drawings:

FIG. 2 is a side cross-sectional view of the shield arrangement of the second embodiment of the present invention;

DETAILED DESCRIPTION OF THE INVENTION

Figure 1:
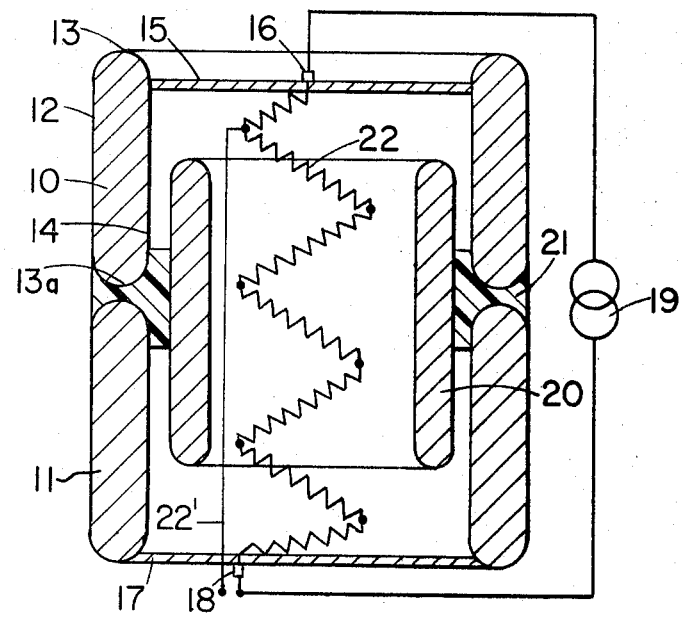
FIG. 1 is a side cross-sectional view illustrating the first embodiment of the present invention.

The first embodiment of the present invention, shown in FIG. 1, is designed for improved performance at A.C. frequencies and high voltages. The instrument includes a top hat ring 10 and a ground-plane shield ring 11. Both the top hat 10 and ground shield 11 are of an electrically conductive material, such as a copper or aluminum alloy. They are of the same shape and size and each consists of a ring which is elongated axially and are stacked and co-axial in relationship to each other. The top hat 10 has an outer wall 12, a top 13, an inner wall 14, and a bottom 13a. It is closed at its top by a metal electrically conductive top 15 to which it is conductively fastened. The conductive top 15 is connected, by terminal 16, to the source of high voltage A.C. current, for example, from 1,000 volts to 100,000 volts and 60 Hz. frequency. The ground shield 11 is connected to a metal electrically conductive bottom closure 17 which has a terminal 18 connected to the other lead to the A.C. source 19.

The rings 10 and 11 are coaxial and surround a tandem series string of impedance elements 22, for example, resistors. The rings, in shape, are axially elongated toroids. The impedance element series have end terminals 16, 18 which are connectable to the source of A.C. current 19. An internal electrically conductive elongated ring 20 is positioned inside of rings 10 and 11 and is coaxial with them. The ring 20 is held in position by an insulator ring 21, for example, of plastic resin. If the voltage is V and O at its two extremes, then the ring 20 will float and be isolated at V/2. The desired potential gradient is created by the self-shielding rings. Their symmetry and capacitance balance along the vertical axis of the potentiometer creates the electrical potential gradient.

The resistors used in the high voltage divider of the present invention, providing the alloy is suitably selected and heat-treated, have a resistance or ratio of resistance that is constant with a few parts in one million over a satisfactory temperature range. The resistors are preferably wire-wound resistors which are preferably made of manganin, although alternatively other types of resistors, such as carbon resistors, may be used.

The second and preferred embodiment of the present invention is illustrated in FIG. 2. This embodiment reduces the shifting from the desired values of the guards due to their capacitance to ground. The guard structure consists of a plurality — at least three and, for example, five or seven — of elongated guard rings 30–39. Those guard rings are centered on a common axis, that is, they are coaxial. The guard rings are of an electrically conductive material such as copper or aluminum alloys. They may, depending upon the voltages and current to be used with the instrument: (a) be formed from thin metal tapes joined at their ends to form axially elongated rings, or (b) be machined from metal ring members, or (c) be a curved foil having lines etched away.

When the input power V is applied across guard shields 30 and 31, then, because of the symmetry of the design, the guard shield 33 will "float" at a mid-potential value of V/2. Similarly, the third-order guard shields 34,35 will have mid-potential values of ¾V and ¼V respectively. The guard shield 33 is shielded from external space charges by its external guard shields 31, 32. Similarly, the internal guard shields 36, 37, 38, 39, a set of fourth-order guard shields, will have respective potentials of ⅛V, ⅜V, ⅝V and ⅞V respectively. If desired, a still further set, or sets, of internal shields may be used.

It has been found that accuracy of 0.01 percent or better and elimination of proximity effects may be obtained using the structure of FIG. 2 invention. The structure prevents distortion of the guard level potentials without a complex or expensive structure. If desired, the resistors of the string may be spaced so that the resistive potential points correspond with the voltage gradient of the innermost rings of the shield.

As in the prior embodiment, the top cover 40 and the bottom cover 41 are both metal electrically conductive covers. The string of impedance elements, in this case resistors 22, have taps, shown at their change of direction points and variable tap means 22' connected to one point. Although the rings have been illustrated with thickness, they may be formed from a relatively thin sheet of metal, that is, in the form of metal bands.

Figure 3:
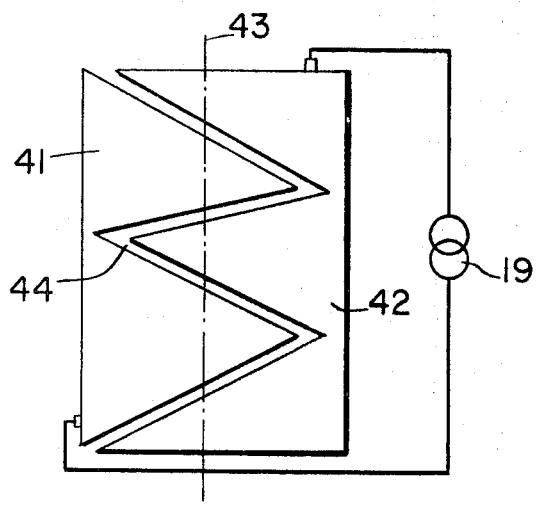
FIG. 3 is a side plan view of the form of the shield in the third embodiment of the present invention, in which the inside tubular shield is, in effect, cut parallel to the axis and laid flat only for the purpose of illustrating the arrangement.

In the embodiment of FIG. 3 there are only two conductive rings 45 and 46. Each ring 45 and 46, as in the previous embodiments, is electrically connected to a conductive cover and the covers are electrically connected to the high voltage A.C. source 19. The actual structure of the embodiment of FIG. 3 is tubular, i.e., circular, as seen in a top cross-sectional view. However, the inner wall has been split, parallel to the axis 43, and the wall shown as being flat, which is only for the purpose of illustrating the arrangement of the rings. The impedance elements are centered along the axis 43. The saw-tooth arrangement of the rings 41, 42 is to avoid a problem of uneven voltage gradients in case the impedance elements are, anywhere along their length, off-center (off the axis). As shown, there is an air gap or a line of insulation 44 which is saw-toothed in shape between the conductive rings 41, 42.

Figure 4:
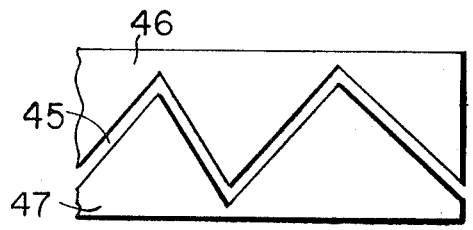
FIG. 4 is a side plan view of another embodiment of the present invention in which two segments of the embodiment of FIG. 2 are, in effect, cut along a line parallel to the axis and laid flat only for the purpose of illustrating the arrangement.

The embodiment of FIG. 4 shows a device for obtaining a linear voltage gradient along the string of impedance elements. The embodiment of FIG. 2 provides a gradual, but step-wise, voltage gradient from 0 to maximum, for example, if measured at the peaks of each electrical cycle. That step-wise gradient may be improved to be a smooth linear gradient by the saw-toothed insulation or air gap 45 between the conductive ring 46 and the conductive ring 47. These rings 46 and 47 are co-axial with the impedance elements and may be the rings of the structure of FIG. 2. The illustration of FIG. 4 shows only two rings, but all the rings may be of the saw-toothed pattern of insulation between them in the axial direction. The insulation may be an air gap or an insulative material.

I claim:

1. A high voltage shielded divider to be connected to a high voltage source, including a dividing circuit consisting of a connected series of impedance elements, each of said impedance elements having the same impedance value as the other impedance elements, variable tap means which may be moved relative to the said elements, and two external connection terminals connected to said series of impedance elements, and an electrical shield at least partially surrounding said impedance elements, said shield comprising at least three conductive rings, namely a first conductive ring and a coaxial second conductive ring which is positioned above said first ring, means connecting said first and second conductive rings to the high voltage source, and a third conductive ring between said first and second conductive rings and said impedance elements and insulated from them, and not connected to the high voltage source.

2. A high voltage shielded divider as in claim 1 and further comprising a fourth conductive ring and a fifth conductive ring which are positioned substantially coaxial with the other rings and between the impedance elements and the second ring and insulated from them and not connected to the source of high voltage.

3. A high voltage shielded divider to be connected to a high voltage source, including a dividing circuit consisting of a connected series of impedance elements, variable tap means which may be moved relative to the said elements, and two external connection terminals connected to said series of impedance elements, and an electrical shield at least partially surrounding said impedance elements, said shield comprising at least three conductive rings, namely a first conductive ring and a coaxial second conductive ring which is positioned above said first ring, means connecting said first and second conductive rings to the high voltage source, and a third conductive ring between said first and second conductive rings and said impedance elements and insulated from them, and not connected to the high voltage source, and further comprising a fourth conductive ring and a fifth conductive ring which are positioned substantially coaxial with the other rings and between the impedance elements and the second ring and insulated from them and not connected to the source of high voltage.

4. A high voltage shielded divider as in claim 3 and further comprising sixth, seventh, eighth and ninth conductive rings which are positioned between the impedance elements and said fourth and fifth rings and which are coaxial with them and insulated from them.

5. A high voltage shielded divider as in claim 2 wherein a line of insulation is between each of the rings and the line of insulation between at least two of the rings is saw-toothed in shape.

* * * * *